United States Patent
Ginetti

(10) Patent No.: US 10,055,528 B1
(45) Date of Patent: Aug. 21, 2018

(54) METHODS, SYSTEMS, AND COMPUTER PROGRAM PRODUCT FOR IMPLEMENTING ENGINEERING CHANGE ORDERS WITH FIGURE GROUPS AND VIRTUAL HIERARCHIES

(71) Applicant: Cadence Design Systems, Inc., San Jose, CA (US)

(72) Inventor: Arnold Ginetti, Antibes (FR)

(73) Assignee: Cadence Design Systems, Inc., San Jose, CA (US)

(*) Notice: Subject to any disclaimer, the term of this patent is extended or adjusted under 35 U.S.C. 154(b) by 130 days.

(21) Appl. No.: 15/282,739

(22) Filed: Sep. 30, 2016

(51) Int. Cl.
  *G06F 17/50* (2006.01)
(52) U.S. Cl.
  CPC ...... *G06F 17/5072* (2013.01); *G06F 17/5081* (2013.01)
(58) Field of Classification Search
  CPC .................................................. G06F 17/5072
  USPC ......................................................... 716/119
  See application file for complete search history.

(56) References Cited

U.S. PATENT DOCUMENTS

| | | |
|---|---|---|
| 6,256,768 B1 | 7/2001 | Igusa |
| 7,062,475 B1 | 6/2006 | Szabo |
| 7,117,473 B1 | 10/2006 | Knol |
| 7,120,892 B1 | 10/2006 | Knol |
| 7,469,255 B2 | 12/2008 | Kusterer |
| 7,710,420 B2 | 5/2010 | Nonclercq |
| 7,810,064 B2 | 10/2010 | Ladin |
| 7,921,096 B2 | 4/2011 | Allen |
| 8,438,530 B2 | 5/2013 | Giffel |
| 8,527,890 B2 | 9/2013 | Harada |
| 8,595,237 B1 | 11/2013 | Chaudhary |
| 2003/0101331 A1 | 5/2003 | Boylan |
| 2004/0083210 A1 | 4/2004 | Ochiai |
| 2005/0091627 A1* | 4/2005 | Satapathy ........... G06F 17/5068 716/102 |
| 2005/0138591 A1 | 6/2005 | Shirai |
| 2006/0218156 A1 | 9/2006 | Schechinger |
| 2009/0199143 A1 | 8/2009 | Schlotman |
| 2010/0306729 A1* | 12/2010 | Ginetti ................ G06F 17/5068 716/124 |
| 2011/0107281 A1 | 5/2011 | Sun |
| 2011/0191303 A1 | 8/2011 | Kaufman |
| 2013/0187941 A1 | 7/2013 | Noon |

(Continued)

OTHER PUBLICATIONS

Non-Final Office Action dated Mar. 26, 2018 for U.S. Appl. No. 15/283,081.

(Continued)

*Primary Examiner* — Suresh Memula
(74) *Attorney, Agent, or Firm* — Vista IP Law Group, LLP

(57) ABSTRACT

Disclosed are methods, systems, and articles of manufacture for implementing engineering change orders (ECOs) with figure groups and virtual hierarchies. These techniques identify a schematic design and a layout having at least one virtual hierarchy of an electronic design. These techniques then implement an ECO to modify at least one layout circuit component design in a figure group, without considering a physical hierarchical structure of the layout. These techniques further check the figure group based in part or in whole upon one or more criteria and update one or more data structures for the at least one virtual hierarchy and the figure group based in part or in whole upon the ECO.

20 Claims, 10 Drawing Sheets

(56) References Cited

U.S. PATENT DOCUMENTS

2014/0177940 A1    6/2014   Nakagaki
2015/0269297 A1    9/2015   Tuan
2015/0363478 A1   12/2015   Haynes
2017/0235848 A1    8/2017   Van Dusen

OTHER PUBLICATIONS

Notice of Allowance dated Apr. 16, 2018 for U.S. Appl. No. 15/283,089.
Notice of Allowance dated May 1, 2018 for U.S. Appl. No. 15/282,778.
Final Office Action dated May 30, 2018 for U.S. Appl. No. 15/199,903.
Non-Final Office Action dated Jun. 15, 2018 for U.S. Appl. No. 15/283,042.
NA9109385, "Design Extensions to Contents View", IBM Technical Disclosure Bulletin, Sep. 1991, vol. 34, No. 4A, pp. 385-388 (4 pages).

\* cited by examiner

METHODS, SYSTEMS, AND COMPUTER PROGRAM PRODUCT FOR IMPLEMENTING ENGINEERING CHANGE ORDERS WITH FIGURE GROUPS AND VIRTUAL HIERARCHIES

CROSS REFERENCE TO RELATED U.S. PATENT APPLICATIONS

This Application is related to U.S. patent application Ser. No. 15/199,903 entitled "METHODS, SYSTEMS, AND COMPUTER PROGRAM PRODUCT FOR IMPLEMENTING AN ELECTRONIC DESIGN BY MANIPULATING A HIERARCHICAL STRUCTURE OF THE ELECTRONIC DESIGN" and filed on Jun. 30, 2016 U.S. patent application Ser. No. 15/282,778 entitled "METHODS, SYSTEMS, AND COMPUTER PROGRAM PRODUCT FOR IMPLEMENTING SYNCHRONOUS CLONES FOR AN ELECTRONIC DESIGN", U.S. patent application Ser. No. 15/283,052 entitled "METHODS, SYSTEMS, AND COMPUTER PROGRAM PRODUCT FOR IMPLEMENTING LEGAL ROUTING TRACKS ACROSS VIRTUAL HIERARCHIES AND LEGAL PLACEMENT PATTERNS", U.S. patent application Ser. No. 15/283,089 entitled "METHODS, SYSTEMS, AND COMPUTER PROGRAM PRODUCT FOR IMPLEMENTING A FLOORPLAN WITH VIRTUAL HIERARCHIES AND FIGURE GROUPS FOR AN ELECTRONIC DESIGN", U.S. patent application Ser. No. 15/283,042 entitled "METHODS, SYSTEMS, AND COMPUTER PROGRAM PRODUCT FOR DYNAMICALLY ABSTRACTING VIRTUAL HIERARCHIES FOR AN ELECTRONIC DESIGN", and U.S. patent application Ser. Mo. 15/283,081 entitled "METHODS, SYSTEMS, AND COMPUTER PROGRAM PRODUCT FOR IMPLEMENTING DYNAMIC MANUVERS WITHIN VIRTUAL HIERARCHIES OF AN ELECTRONIC DESIGN". The contents of the aforementioned U.S. patent applications are hereby expressly incorporated by reference for all purposes.

BACKGROUND

Modern electronic designs often include various cells such as some off-the-shelf configurable or non-configurable library cells, intellectual property (IP) cells, macro cells, etc. Each of these cells may be instantiated multiple times as instances in an electronic design so that when a designer desires or requires to make a change to this cell, the designer only needs to make the change once, and all the change will be automatically reflected in all the instances in the electronic design to save development efforts and to expedite the design cycles so as to shorten the time-to-market of the eventual products.

Conventional electronic design implementations include a top-down and a bottom-up approach. A top-down approach begins the implementation process at the top or highest hierarchy and proceeds to lower hierarchies until it reaches the lowest hierarchy to complete an IC design. With the top-down approach, the functional cells at a higher hierarchy may be brought into the layout canvas while each cell include its own pins, ports, or terminals (collectively pin for singular or pins for plural hereinafter). The details of these functional cells at lower hierarchies are not yet exposed and will be designed at respective lower hierarchies as the top-down approach migrates to lower hierarchies. As a result of the non-exposure or unavailability of lower hierarchies (e.g., the lower hierarchies have not yet been implemented), a circuit designer working on a higher hierarchy may need to estimate the size of each cell and guess or guesstimate the locations of pins or terminals for the cell. The estimated cell may be too big to waste invaluable space on silicon or may be too small to accommodate all the devices therein.

In addition to the manual efforts to create the location, identification, etc. for a pin of a cell, these guesstimated pin or terminal locations unlikely to be optimal for connecting with the pins or ports of the devices within the cell. Either way, multiple iterations may be required for even a single cell. In addition, even if the circuit designer knows how these pins are connected to each other, the circuit designer may only align or offset these pins by manipulating the cell. In the event that a designer groups a set of components or cells and intends to create a logical cell for the set, the pins of the logical cell or their identifications thereof (e.g., names of the pins) have to be manually created. The designer will then have to find the corresponding pin identifications in the schematic design and associated these manually created identifications with the corresponding pin identifications.

Bottom-up approaches begin with the design of discrete circuit components and proceed to higher hierarchies as the designs of lower hierarchies are complete until the design for the top or highest hierarchy is complete. In these bottom-up approaches, pins and their identifications as well as locations are determined at lower hierarchies in their respective cells. At the higher hierarchies, these pins often present a challenge to routing these pins of an actual or virtual cell because these pins are determined individually for each cell and independent of each other and may thus cause misalignment of pins or terminals at higher hierarchies where these cells are assembled and supposed to be interconnected. To rectify these problems such as pin or terminal misalignment at higher hierarchies, the design process must return to the lower hierarchies where the devices with the misaligned pins are placed, adjust the placement of the devices, and determine whether the pins or terminals are aligned at the next higher hierarchy. These conventional approaches must then proceed to the next higher hierarchy to determine whether there exist other misalignment problems. These conventional approaches may thus iterate multiple times until an acceptable or desirable solution is found. Therefore, there is a need for a better approach to manipulate the hierarchies of an electronic design to effectively and efficiently create a cell for a group of devices.

The problem is exacerbated during the prototyping, floor-planning, placement stage or during the implementation of a portion of an electronic design where no existing IP cells or blocks are available. For example, a designer may be implementing a portion of the design corresponding to a new design for which no existing cells or blocks are available. As another example, a designer may then need to lay out this portion by placing individual components. The design may then need to create one or more cells or blocks for these newly inserted layout components either because of a design requirement or because of a desire or need for reducing the complexity in the appearance of the layout. In these embodiments, the designer may first place a plurality of layout components in a layout and attempt to create one or more cells for the plurality of layout components.

Moreover, many of these layout components may need to be moved or modified to fit various design requirements during these stages. Some conventional approaches group the selected layout components into a cell but do not add any connectivity to such a cell. For example, a cell created by these conventional approaches may have no ports, pins, or terminals to connect to the remaining portion of the electronic design to which this newly created cell belongs. Some conventional approaches attempt to rectify this shortcoming by requiring manual creation of the boundary as well as manual determination of various connections (e.g., pins, terminals, ports, etc.) along the manually created boundary. These conventional approaches invariably involve some guesstimates and hence a number of iterations to finally create the cell with usable connections along the boundary of the cell.

An engineering change order (ECO) is often employed to modify the electronic design after the layout of the electronic design has been placed and routed or even after some post-route optimization or verification tasks have been completed. For example, an ECO may modify the contents or connectivity of a layout cell that may have multiple occurrences spread across the entire layout. With a flat layout having a single hierarchy, this ECO has to be implemented to implement the modifications multiple times for each of the multiple occurrences and thus require repetitive performances of the same operations. With a hierarchical layout having a physical hierarchical structure with multiple physical hierarchies, the ECO may be implemented to modify the physical cell master only once. Nonetheless, the physical cell instances or their respective parents at various physical hierarchies need to be checked out from the hierarchical layout database and replaced with a reference to the modified cell master, and checked back into the hierarchical layout database. Such modifications thus require multiple network inputs and outputs.

Therefore, there exists a need for methods, systems, and computer program products for implementing engineering change orders (ECOs) with figure groups and virtual hierarchies.

SUMMARY

Disclosed are method(s), system(s), and article(s) of manufacture for implementing engineering change orders (ECOs) with figure groups and virtual hierarchies in one or more embodiments. Some embodiments are directed at a method for implementing engineering change orders (ECOs) with figure groups and virtual hierarchies. In these embodiments, a schematic design and a layout having at least one virtual hierarchy may be identified for an electronic design. These techniques then implement an ECO to modify at least one layout circuit component design in a figure group, without considering a physical hierarchical structure of the layout. These techniques further check the figure group based in part or in whole upon one or more criteria and update one or more data structures for the at least one virtual hierarchy and the figure group based in part or in whole upon the ECO.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various techniques are directed to implementing engineering change orders (ECOs) with figure groups and virtual hierarchies in various embodiments. These techniques identify a schematic design and a layout of an electronic design. An engineering change order (ECO) is identified and implemented to modify at least one layout circuit component design located at a virtual hierarchy, without checking in or checking out the at least one layout circuit component design or instances of one or more layout cells from a hierarchical layout database for the layout.

The virtual hierarchical structure of the layout may be updated to remain in sync with the schematic hierarchy of the schematic design based in part or in whole upon the modifications to the layout via the ECO. One or more data structures storing thereupon hierarchical information may be updated to reflect the modifications caused by the ECO. In some embodiments where one or more figure groups are detached or materialized into materialized cells or blocks, the physical hierarchical structure of the layout may also be updated to reflect the materialization of the one or more figure groups and hence one or more virtual hierarchies at which the one or more figure groups were originally located.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1:
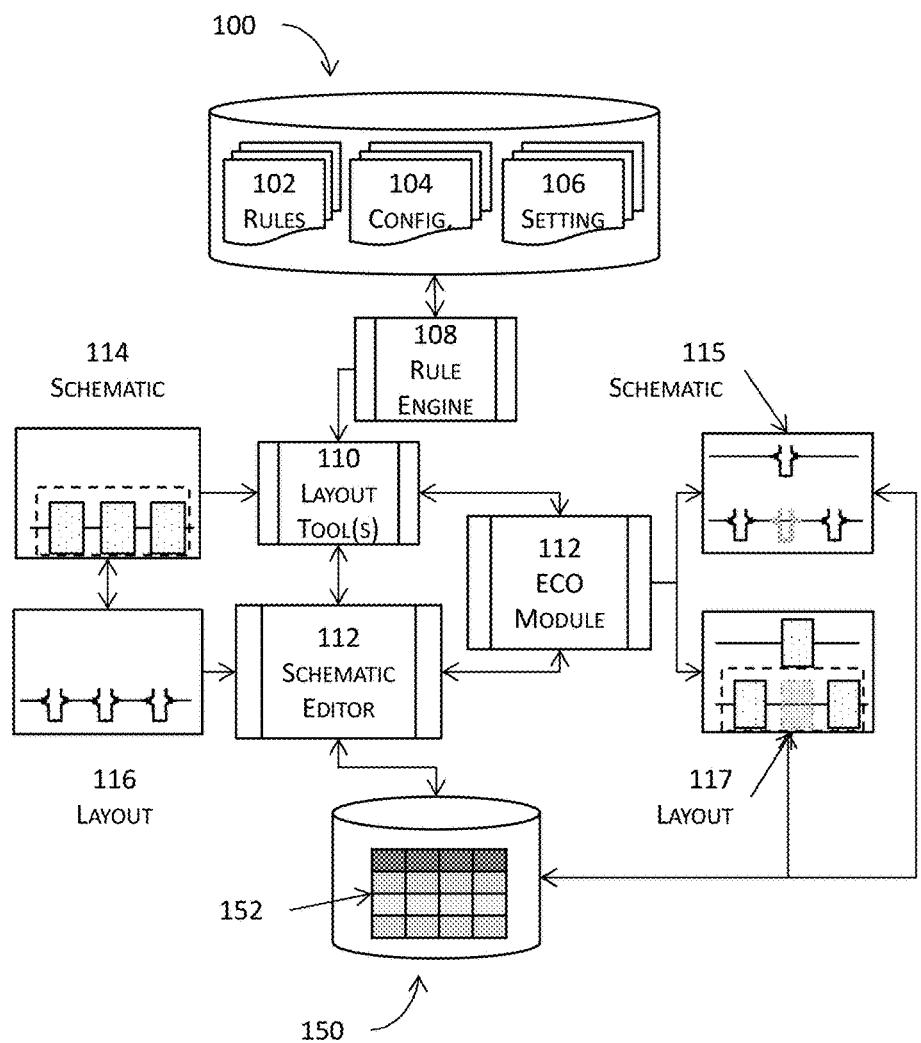
FIG. 1 illustrates a high level block diagram of a simplified system for implementing engineering change orders (ECOs) with figure groups and virtual hierarchies in one or more embodiments.

FIG. 1 illustrates a high level block diagram of a simplified system for implementing engineering change orders (ECOs) with figure groups and virtual hierarchies in one or more embodiments. In these embodiments, one or more layout tools 110 (e.g., a layout editor) may be coupled with a clone engine 112. These one or more layout tools 110 may be further coupled to a rule engine 108 that accesses a set of rules 102, a set of configurations 104, and/or a set of settings 106 stored in a persistent or transient non-transitory computer readable storage medium 100 to implement one or more engineering change orders based in part or in whole upon the applications of the set of rules, configurations, and/or settings.

In operation, the one or more layout tools 110 may reference a schematic design 114 of an electronic design (e.g., an IC design), identify schematic master cells or instances thereof from the schematic design 114, invoke the rule engine 108 to apply a set of rules (102), configurations (104), and/or settings (106), and invoke the ECO (engineering change order) module 112 that function in tandem with the one or more layout tools 110 to implement one or more ECOs to modify the layout 116 into the modified layout 116. The ECO module 112 may also function in tandem with the schematic editor 112 to update the schematic 114 into the updated schematic 115 according to the one or more ECOs implemented in the modified layout 117 so that the updated schematic 115 and the modified layout 117 remain synchronized. Information about the clones in the layout 116, the schematic design 114, the modified layout 117, the updated schematic design 115, and other pertinent, desired, or required information (e.g., information about schematic, physical, and/or virtual hierarchies, figure groups, etc.) may then be maintained at a data structure 152 on a persistent or transient non-transitory computer readable storage medium 150.

Figure 2:
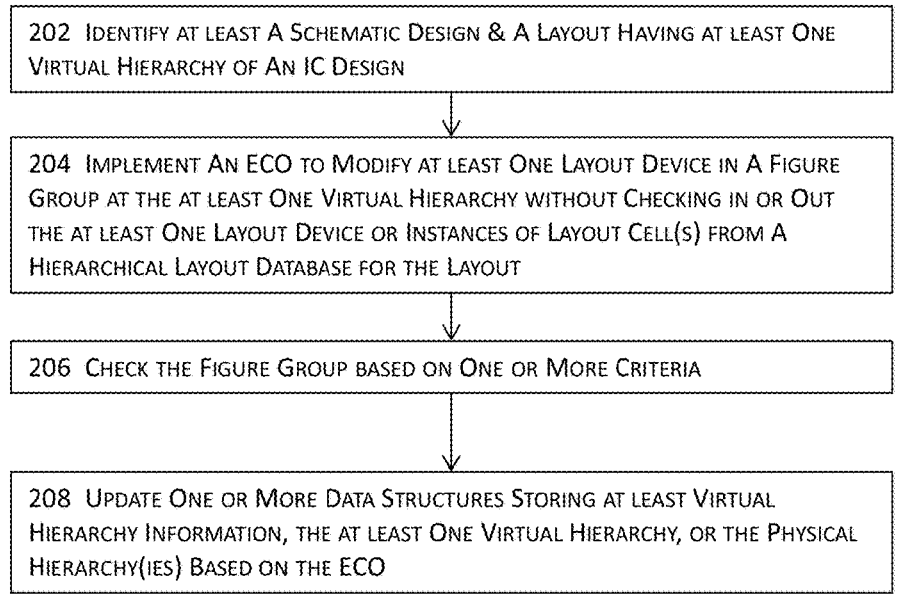
FIG. 2 illustrates a high level block diagram for implementing engineering change orders (ECOs) with figure groups and virtual hierarchies in one or more embodiments.

FIG. 2 illustrates a high level block diagram for implementing engineering change orders (ECOs) with figure groups and virtual hierarchies in one or more embodiments. In these embodiments, a schematic design and a layout of an electronic design may be identified at 202. It shall be noted that the schematic design and the layout identified at 202 need not be complete, and the techniques described herein apply with full and equal effects to incomplete, partial schematic design or layout.

An engineering change order (ECO) may be identified and implemented at 204 to modify at least one layout circuit component design in a figure group. The ECO may be implemented to modify at least one layout circuit component design at the at least one virtual hierarchy. For example, the ECO may add a layout circuit component design, delete a layout circuit component design, modify the placement of a layout circuit component design, change the hierarchy at which the layout circuit component design is located, modify the routing between layout circuit component designs, etc.

If the target layout circuit component designs that are to be modified by the ECO do not belong to a figure group, a figure group at a virtual hierarchy may be created either ahead of time prior to the ECO implementation or on the fly during the ECO implementation. In some embodiments, these techniques may identify the schematic instance that corresponds to the target layout circuit component designs using the binding information between the schematic design and the layout and create a figure group for the layout circuit components that correspond to the identified schematic instance. In these embodiments, these techniques ensure that all schematic instances in the schematic design correspond to their respective figure groups in the layout. More details about creating figure groups are described in U.S. patent application Ser. No. 15/199,903 entitled "METHODS, SYSTEMS, AND COMPUTER PROGRAM PRODUCT FOR IMPLEMENTING AN ELECTRONIC DESIGN BY MANIPULATING A HIERARCHICAL STRUCTURE OF THE ELECTRONIC DESIGN" and filed on Jun. 30, 2016, the contents of which are expressly incorporated by reference for all purposes.

The figure group referenced during the implementation of the ECO may be checked at 206. In some embodiments, the checks performed at 206 compare the contents of the figure group to the contents of the corresponding schematic instance to ensure that they have the same circuit component designs (although at different abstraction levels—schematic level and layout level). In some of these embodiments, the checks may further compare the connectivity information for the schematic instance and that for the figure group to ensure that the schematic instance and the corresponding figure group have the same circuit component designs, and that these circuit component designs are connected in the same manner. If any discrepancies are discovered, the schematic instance, the figure group, or both the schematic instance and the figure group may be modified to ensure that the schematic instance and the figure group have the same circuit component designs connected in the same way.

In some embodiments, the checks performed at 206 may further determine whether all schematic instances in the schematic design correspond to their respective figure groups by examining a data structure storing thereupon the correspondence information between schematic instances (or their schematic master cell(s)) in the schematic design and the figure groups in the layout. If it is determined that one or more schematic instances do not correspond to any figure groups, the corresponding figure groups will be created for these one or more schematic instances.

One or more data structures storing thereupon at least information about the virtual hierarchy may also be updated at 208 to reflect any changes caused by the ECO. These one or more data structures may further store, for example, information about one or more schematic hierarchies corresponding to the physical hierarchy and/or one or more virtual hierarchies, information about the schematic instances or schematic master(s) thereof corresponding to layout circuit component designs in a figure group or the figure group itself, or any other pertinent information that is pertinent to the schematic portion or layout portion affected by the ECO, etc. In addition, the virtual hierarchical structure including the at least one virtual hierarchy may be updated at 206 to remain in sync with the schematic hierarchy of the schematic design in some embodiments. In addition to updating the virtual hierarchical structure, the physical hierarchical structure of the layout may also be updated at 206 in response to the implementation of the ECO that may change the physical hierarchical structure in some embodiments.

One of the advantages of these techniques of implementing ECOs using virtual hierarchies and figure groups is that during the ECO implementation, the EDA tools retain all the benefits of operating on a figure group having a plurality of layout circuit component designs as if the EDA tools were operating on a layout cell instance. Nonetheless, the EDA tools no longer need to check out any cell or block instances at any physical hierarchies from the layout database to implement the ECO and check such cell or block instances back into the layout database when the ECO implementation is completed. Rather, these techniques enable the EDA tools to simply operate on the figure group and create the figure group for the ECO implementation if the figure group does not yet exist. More details about a figure group are described in U.S. patent application Ser. No. 15/199,903 entitled "METHODS, SYSTEMS, AND COMPUTER PROGRAM PRODUCT FOR IMPLEMENTING AN ELECTRONIC DESIGN BY MANIPULATING A HIERARCHICAL STRUCTURE OF THE ELECTRONIC DESIGN" and filed on Jun. 30, 2016, the entire contents of which are expressly incorporated by reference for all purposes.

Figure 3A:
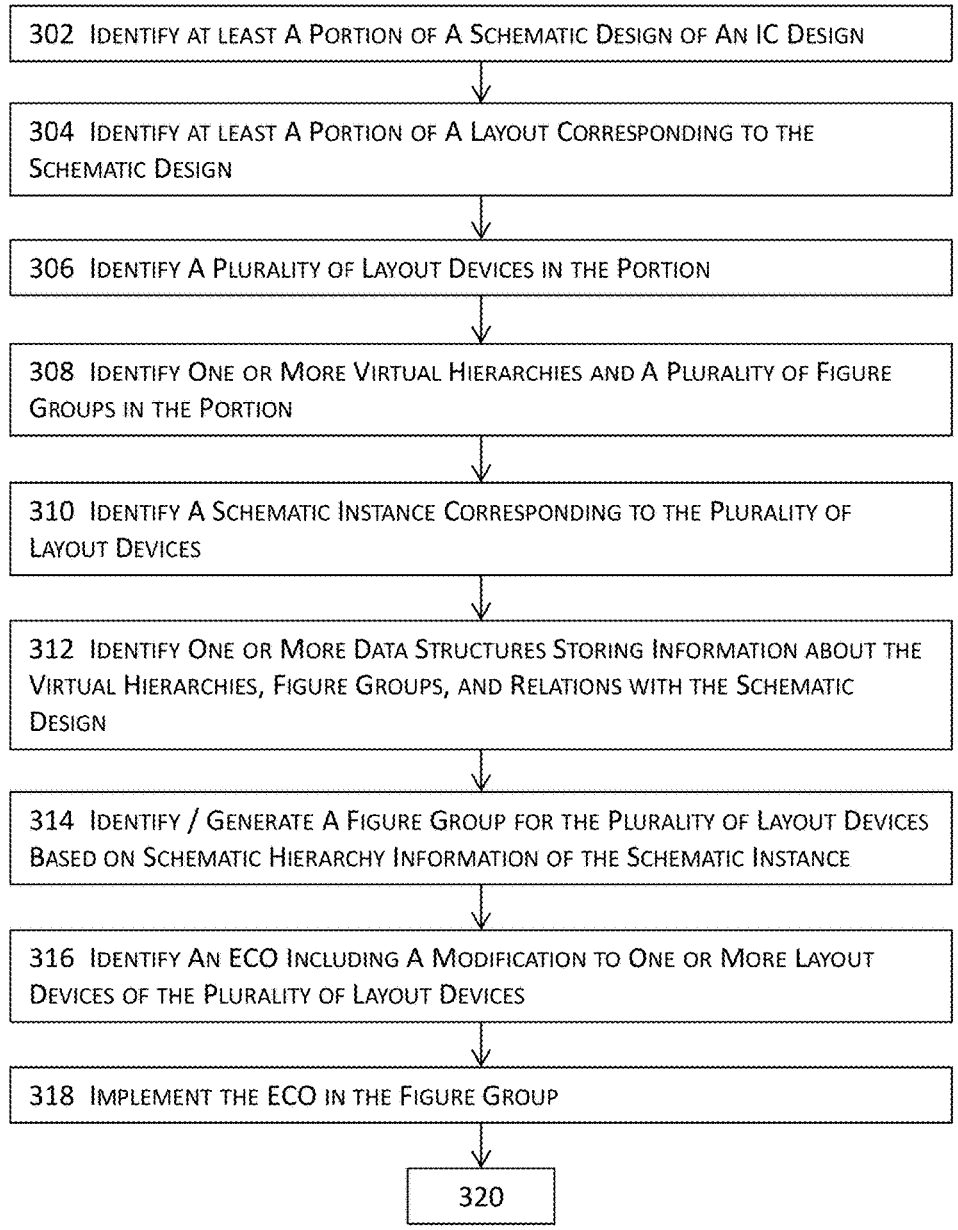
FIGS. 3A-3C jointly illustrate a more detailed block diagram for implementing engineering change orders (ECOs) with figure groups and virtual hierarchies in one or more embodiments.
Figure 3B:
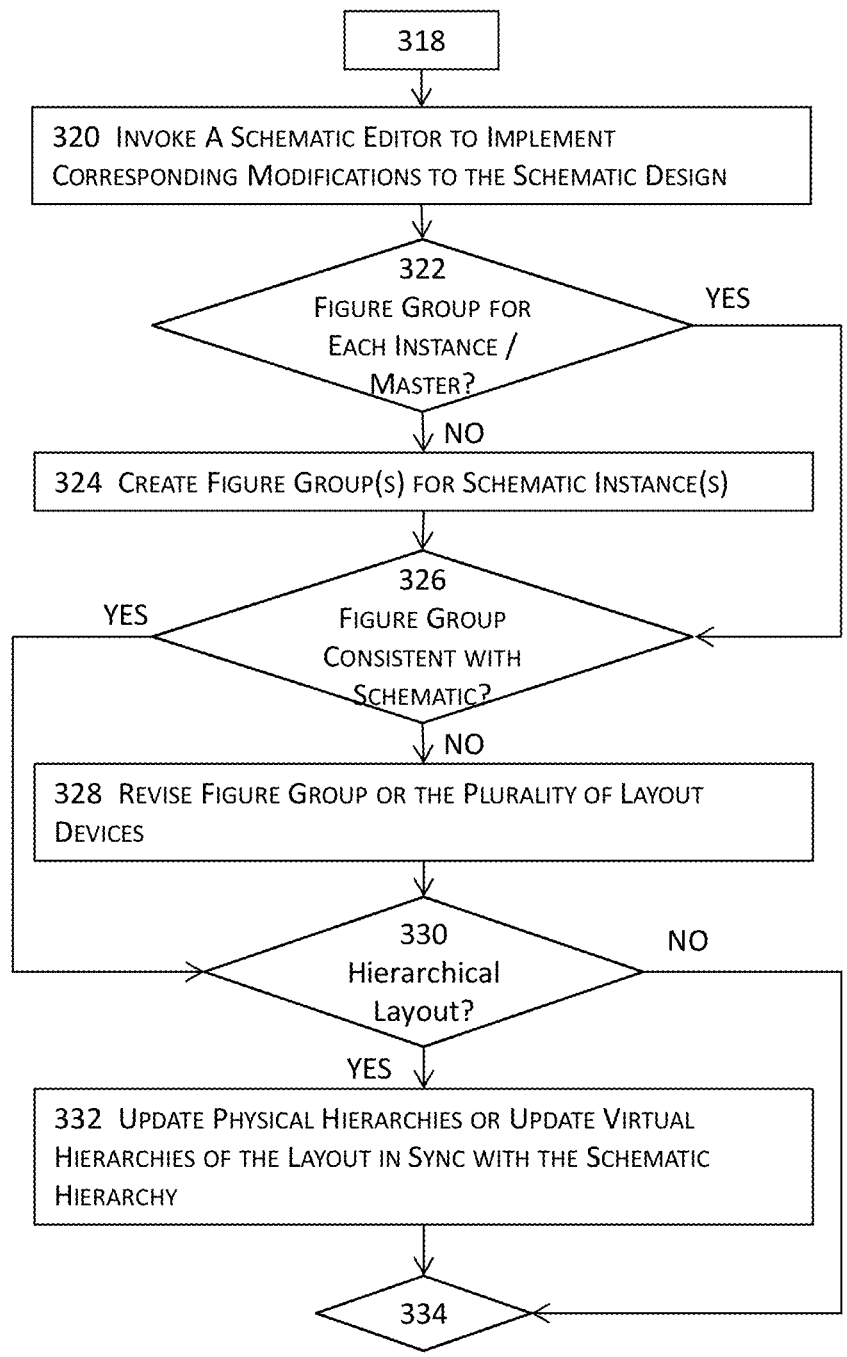
Figure 3C:
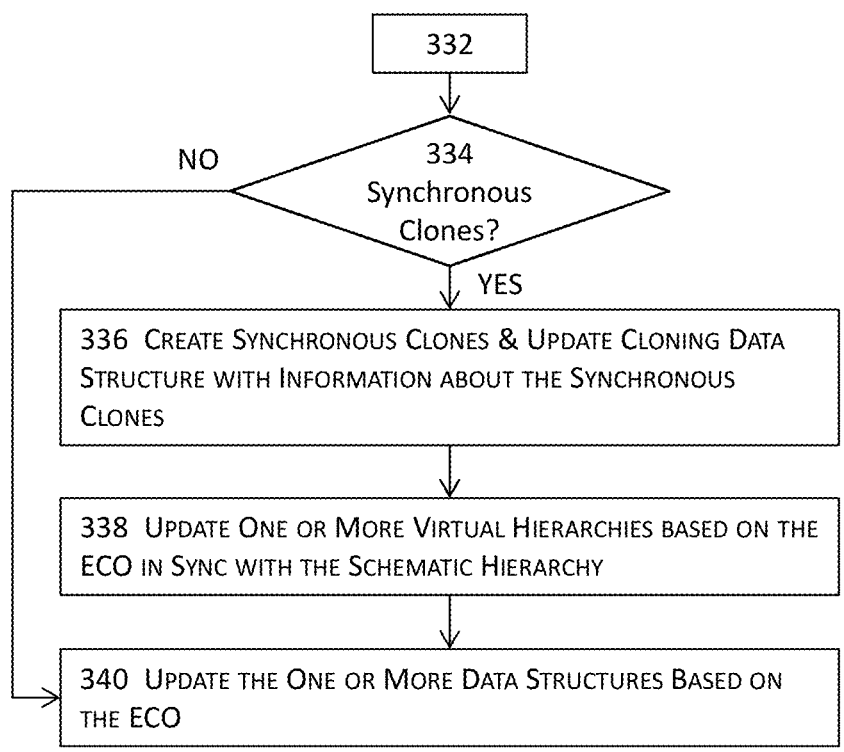

FIGS. 3A-3C jointly illustrate a more detailed block diagram for implementing engineering change orders (ECOs) with figure groups and virtual hierarchies in one or more embodiments. In these embodiments, at least a portion of a schematic design may be identified at 302 for an electronic design (e.g., an integrated circuit or IC design). At a portion of a layout corresponding to the portion of the schematic design may be identified at 304 for the electronic design.

The schematic design identified at 302 may include a plurality of schematic instances of one or more schematic master cells. In these embodiments, a schematic design and a layout including at least one virtual or logic hierarchy (collectively virtual hierarchy) under the top physical hierarchy or the single hierarchy of a flat layout of an electronic design (e.g., an integrated circuit or IC design) may be respectively identified at 302 and 304. The layout may be a flat layout in some embodiments. A flat layout may also be deemed as a hierarchical layout having only a single physical hierarchy at which all layout circuit component designs are located.

In these embodiments, these techniques described herein may maintain the layout as a flat layout until or unless it is required or desired to transform the flat layout having all layout circuit component designs at the same level into a hierarchical layout having multiple physical hierarchies. For example, an EDA (electronic design automation) tool or a designer may create some figure groups or virtual blocks (collectively figure group for singular or figure groups for plural) at one or more virtual hierarchies according to, for example, one or more corresponding schematic cell instances during design planning or floorplanning. In some embodiments, these techniques ensures that the layout includes a figure group for each schematic cell instance in the schematic design.

A plurality of layout circuit component designs in a figure group may be identified at 306. In some embodiments where these techniques described herein ensure that all schematic instances correspond to their respective figure groups, but the figure group does not yet exist for the plurality of layout circuit component designs, these techniques may create a figure group by identifying the schematic instance to which the plurality of layout circuit component designs corresponds and creating a boundary to enclose the layout circuit component designs corresponding to the identified schematic instance.

That is, figure groups may be created when the layout is being created based on the schematic, or may be created after a layout has been populated with shapes. For example, these techniques may generate the layout not only by inserting layout shapes into the layout canvas but also by binding the layout shapes to their corresponding schematic cell instances and/or the corresponding schematic masters.

With this binding information, figure groups may be created in the layout by grouping layout shapes and enclosing the group layout shapes into their respective boundaries or bounding boxes. More details about creating figure groups are described in U.S. patent application Ser. No. 15/199,903 entitled "METHODS, SYSTEMS, AND COMPUTER PROGRAM PRODUCT FOR IMPLEMENTING AN ELECTRONIC DESIGN BY MANIPULATING A HIERARCHICAL STRUCTURE OF THE ELECTRONIC DESIGN" and filed on Jun. 30, 2016, the contents of which are expressly incorporated by reference for all purposes.

One or more virtual hierarchies and a plurality of figure groups may be identified at 308 in the portion of the layout identified at 304. A virtual hierarchy exists only logically but does not alter the physical hierarchical structure of a layout. As a result, in some embodiments where the layout is a flat layout having a virtual hierarchy, the physical hierarchical structure of the layout remains flat, but the layout logically appears to include one additional hierarchy (the virtual hierarchy) under the top physical hierarchy or the single hierarchy of a flat layout of an electronic design. Therefore, virtual hierarchies do not alter the physical hierarchical structure of a layout as the layout is referenced in a physical design database. For example, a flat layout has all the layout circuit design components at the same level in the layout canvas, and the layout database includes no parent-child relationships among these layout circuit design components.

A virtual hierarchy may be created to correspond to a schematic hierarchy and may be interrelated to the physical hierarchical structure of a layout by decorating a physical hierarchy with one or more virtual hierarchies that logically represent the parent(s) and/or child(ren) of the physical hierarchy. Virtual hierarchies may be created (e.g., as an object or a software construct) on the fly and may be deleted when no longer needed. A virtual hierarchy may be directly materialized into a physical hierarchy, and such a transformation alters the physical hierarchical structure of a layout. A virtual hierarchy may also be indirectly materialized into a physical hierarchy by materializing or detaching a figure group located at the virtual hierarchy into a physical cell or block. A physical hierarchical structure may be decorated or annotated with information about one or more virtual hierarchies in the layout. For example, a physical hierarchy may be decorated with the information about one or more virtual hierarchies that logically represent the parent(s) and/or child(ren) of the physical hierarchy.

A figure group or a virtual block or cell (collectively figure group) located at a virtual hierarchy may be subsequently determined to be sufficiently stable in the layout. For example, a placement engine may be invoked to place the layout circuit component designs in the figure group so that the figure group complies with the rules, requirements, and/or constraints on the placement of these layout circuit component designs. This figure group may then be materialized or detached (collectively materialized) into a physical cell or block that may be further persistently stored in the layout database.

When this figure group is materialized, the virtual hierarchy at which the figure group is located is also materialized into a physical hierarchy that alters the original physical hierarchical structure of the layout. For example, if the layout is originally a flat layout including the figure group, the layout is effectively transformed into a hierarchical layout having two physical hierarchies—the top physical hierarchy including the materialized physical cell or block (as well as the other figure groups and layout circuit component designs) and a lower physical hierarchy including the layout circuit component designs in the original figure group.

With the virtual hierarchies and figure groups identified, a schematic instance that correspond to the plurality of layout circuit component designs may be identified at 310. These techniques may bind the schematic instances and/or their schematic master cells to their respective layout circuit component designs when or after the layout is being populated with the layout circuit component designs. This binding information may be used to identify the schematic instance that correspond to the plurality of layout circuit components identified at 306.

One or more data structures storing thereupon information about the virtual hierarchies, figure groups, and/or relations between the virtual hierarchies or the figure groups and the schematic design may be identified at 312. For example, a data structure may store information about a schematic instance, the corresponding schematic master cell, the corresponding figure group, and/or the layout circuit component designs in the corresponding figure group in some embodiments. In some other embodiments, a data structure may be hierarchical and store information about a schematic master cell, its corresponding schematic cell instances, the corresponding figure group for each schematic cell instance, and/or the layout circuit component designs for each figure group.

In some embodiments where these techniques described herein maintain a figure group for each schematic cell instance, the figure group may be identified at 314 if the figure group already exists or may be created at 314 when the figure group for the plurality of layout circuit component designs identified at 306 does not exist. The identification or creation of the figure group for the plurality of layout circuit component designs may be performed based in part or in whole upon the schematic hierarchy information of the schematic instance corresponding to the plurality of layout circuit component designs. This schematic hierarchy information may be used to determine where the virtual hierarchy for the figure group is located with respect to the physical hierarchy.

An ECO including a modification to one or more layout circuit component designs of the plurality of layout circuit component designs may be identified at 316. This ECO may then be implemented at 318 in the figure group for the plurality of layout circuit component designs in the layout. To maintain the binding between the schematic design and the layout, a schematic editor may be invoked at 320 to implement corresponding modifications to the schematic design.

In some embodiments where these techniques maintain a mapping between schematic instances (or schematic master cells) and figure groups, a decision may be made at 322 to determine whether there exists a figure group for each schematic instance. If the decision result is affirmative, the process may proceed to 326 that will be described in greater details below. Otherwise, the process may proceed to generate respective figure groups at 324 for schematic instances that do not yet correspond to any figure groups.

After the ECO is implemented, these techniques may further check the figure group against the schematic instance (or vice versa) to ensure that the schematic instance and the figure group are consistent. For example, these techniques may check to determine whether the schematic instance and its corresponding figure group have the same circuit component designs (although at different abstraction levels—schematic level and layout level), especially after the ECO implementation. In some of these embodiments, the checks may further compare the connectivity information for the schematic instance and that for the figure group to ensure that the schematic instance and the corresponding figure group have the same circuit component designs, and that these circuit component designs are connected in the same manner.

If the determination result at 326 is affirmative, the process may proceed to 330 that will be described in greater details below. Otherwise, the figure group, the corresponding schematic instance, or both the figure group and the corresponding schematic instance may be modified at 328 to ensure the consistency. At 330, these techniques may determine whether the layout is hierarchical and includes more than one physical hierarchy. As described above, these techniques may maintain the layout as a flat layout unless or until it is required or desired to transform the flat layout into a hierarchical one having more than one physical hierarchy in some embodiments.

If the layout is determined to be flat at 330, the process may proceed to 334, which will be described in greater details below. On the other hand, if the layout is determined to be hierarchical and comprise more than one physical hierarchy, the physical hierarchies of the layout may be updated at 332 to ensure that the physical hierarchical structure of the layout is in sync with the schematic hierarchical structure. In addition or in the alternative, the virtual hierarchies of the layout may be updated at 332 to ensure that the virtual hierarchical structure of the layout is in sync with the schematic hierarchical structure.

In some embodiments, these techniques also reduce the design space and provide greater flexibility and ease in manipulating the designs by creating synchronous clones for figure groups so that a modification to one synchronous clone will be automatically populated to the other synchronous clones. A determination may be made at 334 to determine whether synchronous clones are to be created for a set of figure groups. For example, a determination may be made to determine whether synchronous clones are to be created for a set of figure groups corresponding to the same schematic master cell. Synchronous clones may be created for figure groups or even physical cells or blocks if these figure groups have the same topology and same values of one or more common hierarchical parameters that are determined not to be relaxed. More details about synchronous clones are described in U.S. patent application Ser. No. 15/282,778 entitled "METHODS, SYSTEMS, AND COM- PUTER PROGRAM PRODUCT FOR IMPLEMENTING SYNCHRONOUS CLONES FOR AN ELECTRONIC DESIGN", the entire contents of which are expressly incorporated by reference for all purposes.

If the determination result is negative, the process may proceed to 340, which will be described in greater details below. If it is determined 334 that synchronous clones are to be created, synchronous clones may be created at 336 between the figure group in which the ECO has been implemented and one or more other figure groups that have the same topology and same parameter values of one or more common hierarchical parameters. In some of these embodiments, a data structure storing thereupon information about the synchronous clones may be created or updated at 336. For example, a synchronous clone grouping data structure may be created to store the figure groups for which synchronous clones are created.

The virtual hierarchical structure in the layout may be optionally updated at 338 based in part or in whole upon the engineering change order so that the virtual hierarchies remain synchronized with the schematic hierarchies in some embodiments. One or more data structures may be updated at 340 based in part or in whole upon the ECO or its implementation results. These one or more data structures may store, for example, information about the figure group to which the ECO applies, the corresponding schematic instance, the corresponding schematic master cell, versioning or history of the figure group (e.g., before and after the ECO implementation), the list of layout circuit component designs, the list of layout circuit component designs that were modified by the ECO, connectivity changes by the ECO, synchronous clones, etc. or any other desired or required information.

Figure 4A:
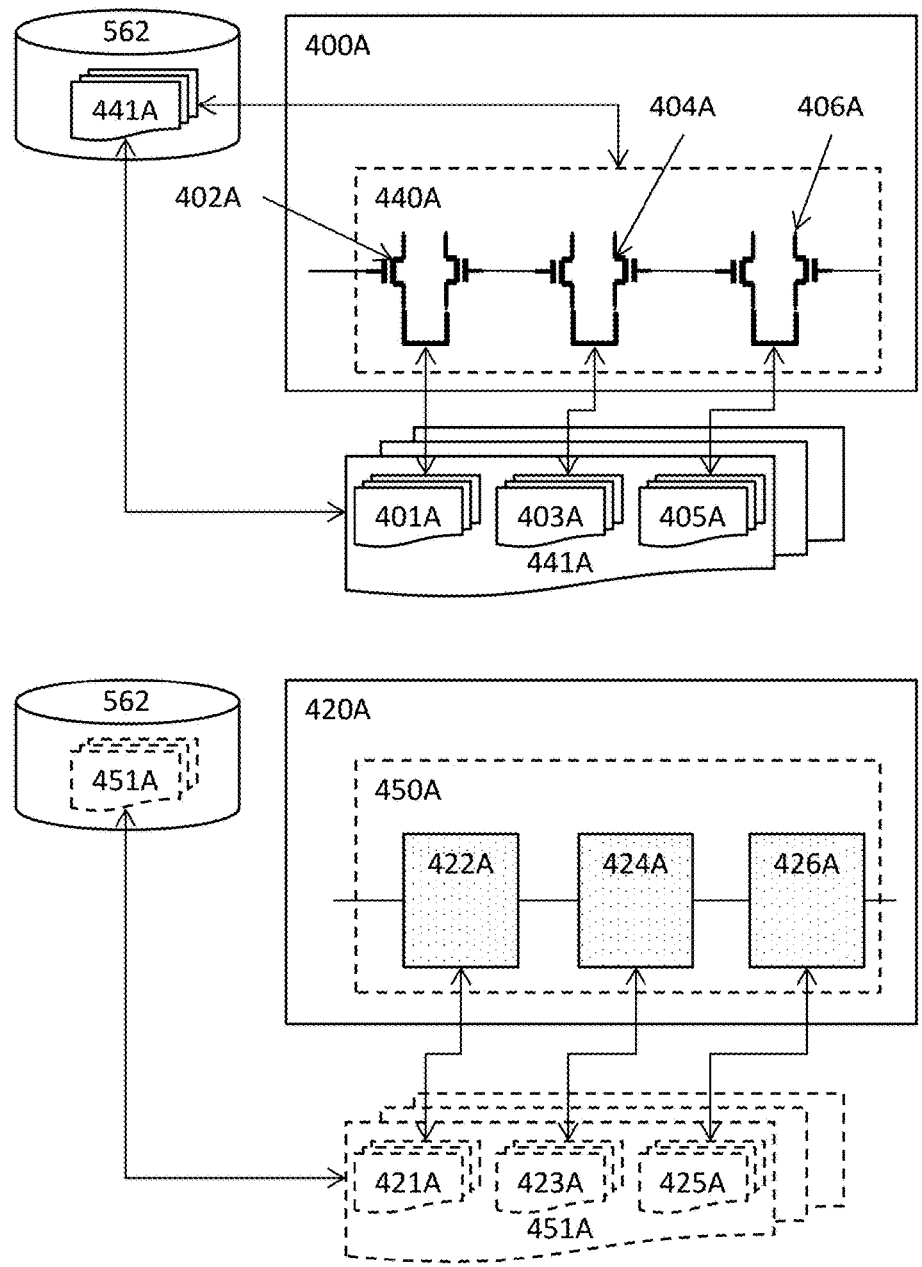
FIGS. 4A-4C illustrate some examples of the application of some techniques for ECO implementation with figure groups and virtual hierarchies described herein to a simplified portion of an electronic design in some embodiments.
Figure 4B:
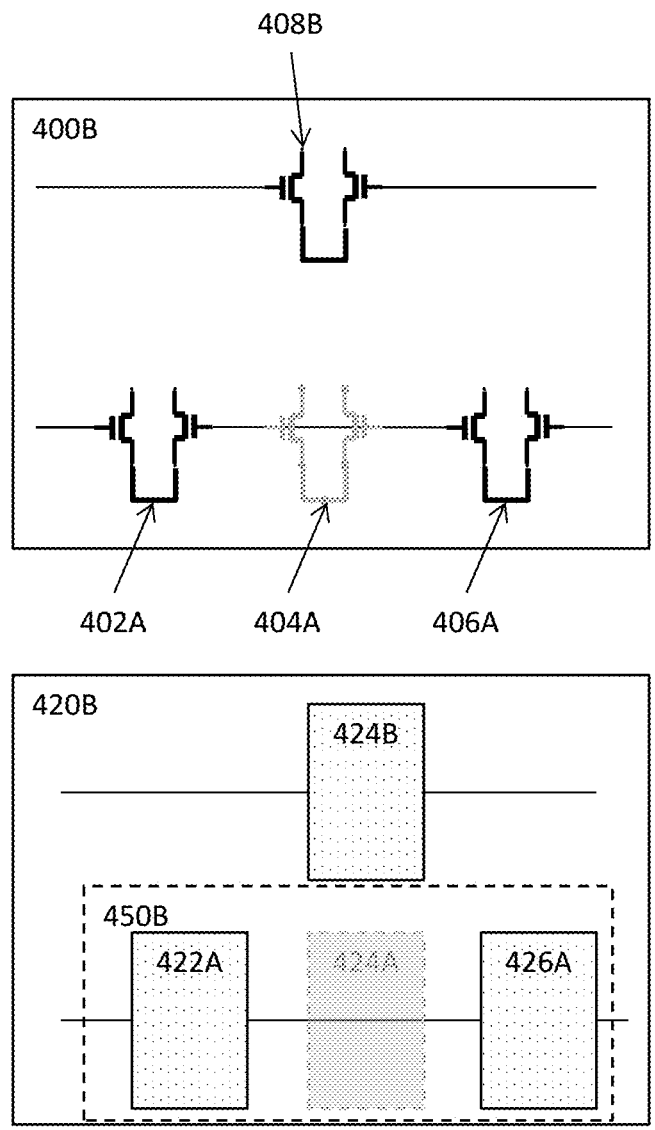
Figure 4C:
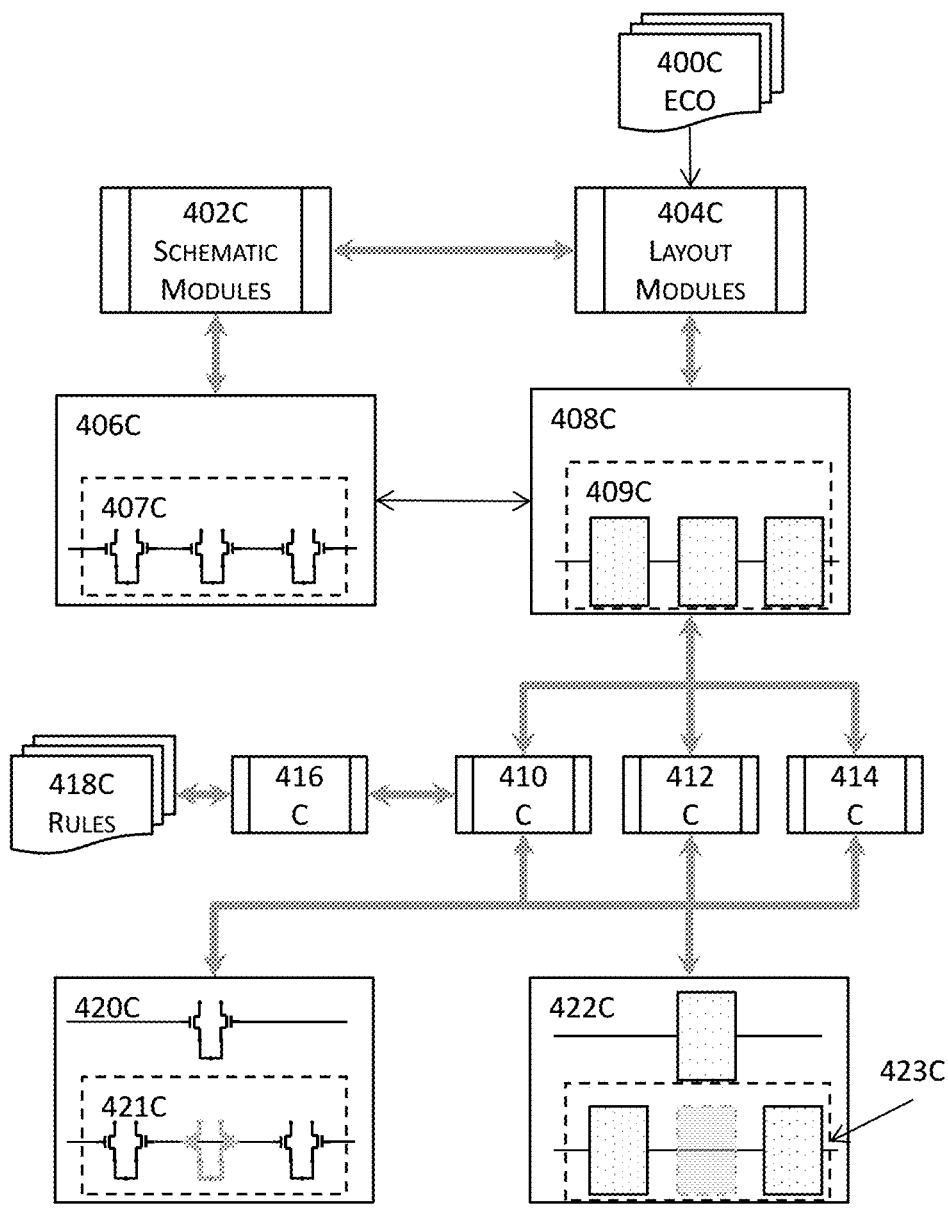

FIGS. 4A-4C illustrate some examples of the application of some techniques for ECO implementation with figure groups and virtual hierarchies described herein to a simplified portion of an electronic design in some embodiments. FIG. 4A illustrates schematic portion 400A of a schematic design including three schematic instances 402A, 404A, and 406A in a schematic cell instance 440A as well the interconnections. FIG. 4A further illustrates the corresponding portion 420A of a layout including layout circuit component designs 422A, 424A, and 426A in a figure group 450A as well as their physical interconnections. The schematic instances 402A, 404A, and 406A respectively correspond to the layout circuit component designs 422A, 424A, and 426A or the corresponding figure group thereof; and the figure group 450A in the corresponding layout portion 420A corresponds to the schematic cell instance 440A.

Figure 5:
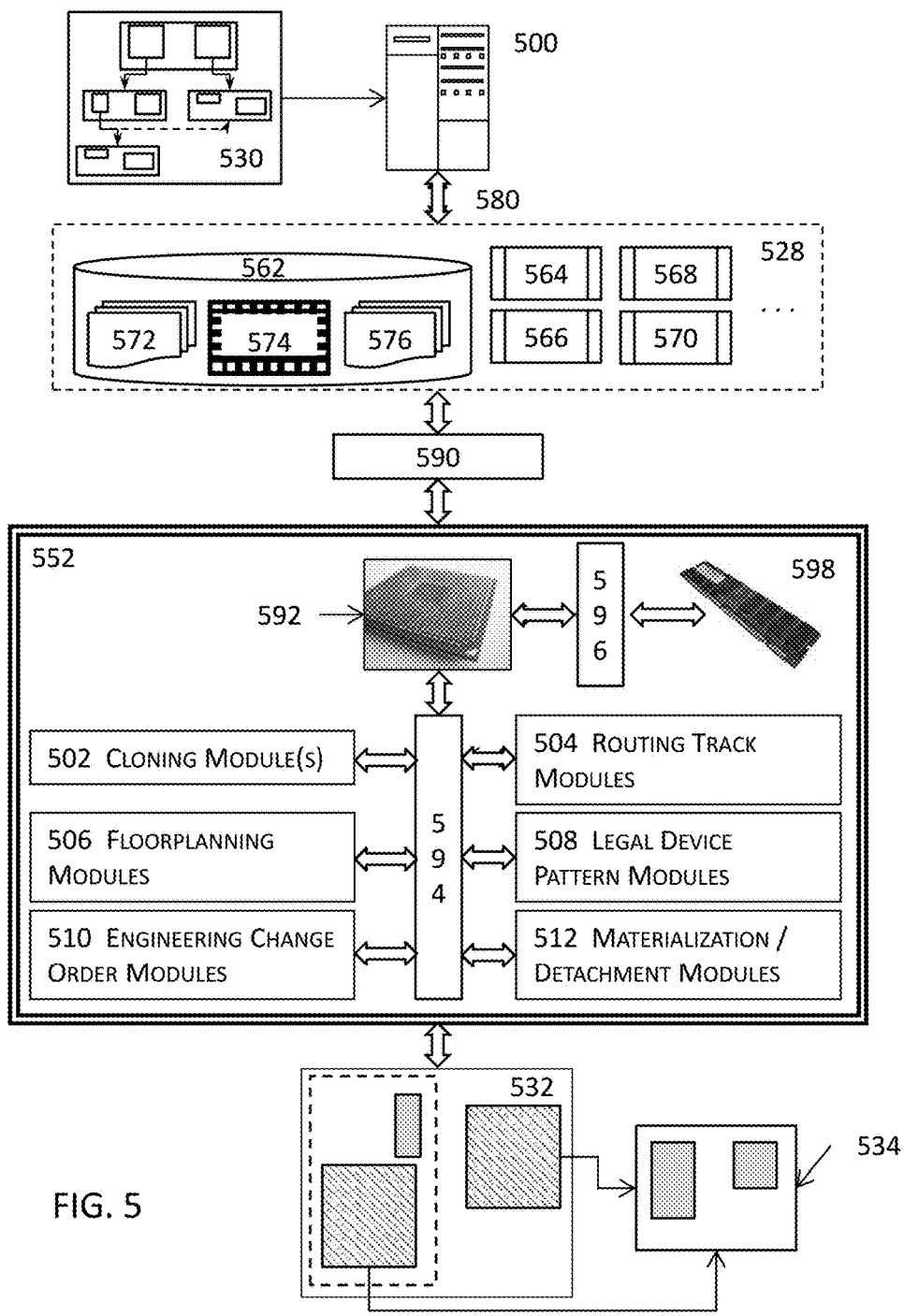
FIG. 5 illustrates another high level block diagram of a simplified system for implementing engineering change orders (ECOs) with figure groups and virtual hierarchies in one or more embodiments.

Moreover, the schematic cell instance 440A may be initiated from a schematic cell master 441A stored in, for example, a non-transitory, persistent or non-persistent computer readable storage medium (e.g., 562 in FIG. 5). The schematic cell master 441A includes the instances or sub-masters of 401A, 403A, and 405A from which the three schematic instances 402A, 404A, and 406A in the schematic instance 440A are respectively instantiated.

In some embodiments where the layout circuit component designs 422A, 424A, and 426A may represent three individual layout devices or three separate sets of layout devices, In some embodiments where each of the three layout circuit component designs 422A, 424A, and 426A includes a plurality of layout devices, these techniques described herein may create a first figure group for each of the three separate sets of layout devices at a first virtual hierarchy. In these embodiments, these techniques may further create a second figure group 450A at a second virtual hierarchy above the first virtual hierarchy for these three first figure groups 422A, 424A, and 426A.

As described in U.S. patent application Ser. No. 15/199, 903 entitled "METHODS, SYSTEMS, AND COMPUTER PROGRAM PRODUCT FOR IMPLEMENTING AN ELECTRONIC DESIGN BY MANIPULATING A HIERARCHICAL STRUCTURE OF THE ELECTRONIC DESIGN" and filed on Jun. 30, 2016, which is expressly incorporated in this application by reference for all purposes, a figure group may be materialized or detached into a physical cell instance in some embodiments. In these embodiments, the second figure group 450A, when materialized into a physical cell instance, corresponds to a layout master cell 451A that may also be stored in the non-transitory persistent or non-persistent computer readable storage medium (e.g., 562 in FIG. 5 or in a different computer readable storage medium). Similar to the schematic master 441A, this layout master 451A may also include three layout instances or sub-masters 421A, 423A, and 425A that further respectively correspond to the schematic instances or sub-masters 401A, 403A, and 405A. The aforementioned correspondence or mapping between the layout portion 420A and the corresponding schematic portion 400A may be stored as binding information that may be further referenced for the implementation of ECOs.

It shall be noted that the use of a dashed line-type in the representations of the layout master 451A and the layout instances or sub-masters 421A, 423A, and 425A indicates that the materialization or detachment of a figure group and hence the creation of a corresponding physical cell instance and its master is entirely optional although an ECO is often initiated after the layout has proceeded through the place and route process and perhaps some post-route optimizations so some or all figure groups may have already been materialized.

FIG. 4B illustrates the implementation of an ECO that adds another layout circuit component design 424B to the portion 420B of the layout. In addition, the ECO also removes layout circuit component 424A (illustrated in light grey indicative of removal from the layout) from the original figure group 450A and hence transforms the original figure group 450A into the modified figure group 450B. As described above, a schematic editor may be invoked to modify the portion 400A of the schematic design to reflect the modifications by the ECO. As FIG. 4B illustrates, the schematic portion 400A is modified into 400B to show the addition of a schematic instance 408B that corresponding to the addition of the layout circuit component design 424B and the removal of the schematic instance 404A (illustrated in light grey indicative of removal from the schematic).

In some embodiments, this schematic revision illustrated in 400B may be a result of automatic invocation of the schematic editor to identify the schematic instances bound to the layout circuit component designs modified by the ECO, add and remove the corresponding schematic instances to the schematic portion, and update the schematic connectivity accordingly. In some other embodiments, this schematic revision illustrated in 400B may be a result of checking the schematic against the layout (or checking the layout against the schematic) as described with reference to 326 and 328. It shall be noted that figure group 450A is also modified into the modified figure group 450B as a result of the ECO implementation. The figure group and the one or more associated data structures may also be updated accordingly as described above with reference to FIGS. 3A-3C.

FIG. 4C illustrates an example of a high level system diagram for implementing engineering change orders (ECOs) with figure groups and virtual hierarchies in one or more embodiments. In these embodiments, a layout 408C may be identified via one or more layout modules 404C. The one or more layout modules 404C may be operatively coupled to one or more schematic modules 402C that natively access the corresponding schematic 406C.

The layout modules and the schematic modules may maintain the binding between the layout 408C and the corresponding schematic 402C in some embodiments so that each schematic circuit component design corresponds to a layout circuit component design, and each schematic instance corresponds to a figure group in the layout 408C. The layout 408C includes a figure group 409C that further includes three layout circuit component designs. In those embodiments where these techniques described herein maintain a figure group for each schematic instance, these three layout circuit component designs in the figure group 409C respectively correspond to the three schematic instances in the schematic design 406C.

An ECO 400C may be received at the one or more layout modules 404C to modify the layout 408C.

Upon or shortly after the receipt of the ECO 400C to modify the layout 408C, the one or more layout modules 404C may invoke one or more modules such as an ECO module 410C, a synchronous clone module 412C, and/or a layout-schematic checking module 414C to implement the ECO. These modules may also function in tandem with the rule and constraint module 416C that ensure that the modifications on the layout 408C comply with pertinent design rules 418C. These modules may then modify the layout 408C into the modified module 422C. The schematic design 406C may also be updated into the modified schematic 420C to reflect the modifications by the ECO implementation by using, for example, a check-against-schematic function and an update-component-and-net function of the module 414C.

In some embodiments where the original figure group 409C is altered by the ECO implementation, the original schematic instance 407C corresponding to the original figure group 409C may also be updated into the modified schematic instance 421C. In some embodiments where synchronous clones have been created for figure groups including the original figure group 409C, all the remaining synchronous clone(s) in the same synchronous clone grouping also reflect the same modifications as shown in the modified figure group 423C. The virtual hierarchy in the layout 422C and the schematic hierarchy in the modified schematic design 420C may also be updated, if necessary, to remain in sync with each other.

FIG. 5 illustrates a high level block diagram of a system for implementing engineering change orders (ECOs) with figure groups and virtual hierarchies in one or more embodiments. In these one or more embodiments, the hardware system in FIG. 5 may comprise one or more computing systems 500, such as one or more general purpose computers described in the System Architecture Overview section to implement one or more special proposes. The illustrative system in FIG. 5 may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 5 may be located in a cloud computing platform in some embodiments.

In some embodiments, the one or more computing systems 500 may invoke various system resources such as the processor(s) or processor core(s), memory, disks, etc. and receive a schematic design 530 and a layout 532 of an electronic design. A cloning module 502 may by itself or in tandem with one or more other modules identify or create clones in the layout 532 that may be optionally materialized into a physical block or cell 534. The one or more computing systems 500 may also initiate or interact with other computing systems to access, via a computer bus architecture (e.g., a system bus, a control bus, a data bus, or any combinations thereof), various resources 528 that may comprise a floorplanner, a placement module, a global routing module, and/or a detail routing module 564, a layout editor 566, a design rule checker 568, a verification engine 570, etc.

The one or more computing systems 500 may further write to and read from a local or remote non-transitory computer accessible storage 562 that stores thereupon data or information such as, but not limited to, one or more databases (574) such as schematic design database(s) or physical design database(s), electronic circuit design specification database(s), various statistics, various data, rule decks, various design rules, constraints, etc. (572), or other information or data (576) that may be used to facilitate the performance of various functions to achieve the intended purposes.

The one or more databases 574 may further include a plurality of cells, blocks, or modules (collectively a cell for singular and cells for plural). Cells may include, for example, one or more standard cells, one or more library cells, one or more memory cells, one or more macro cells, or any combinations thereof. A cell may be an object of a class in the paradigm of object oriented programming and may thus be instantiated into multiple instances to create at least a portion of a hierarchical physical design (e.g., a floorplan, a layout, etc.) or to create a larger and/or more complex cell in some embodiments. In the real hierarchy structure of a hierarchical physical design, certain cells may be situated at the lowest hierarchical level and do not contain any lower hierarchies.

In some embodiments, the one or more computing systems 500 may include or, either directly or indirectly through the various resources 528, invoke a set of mechanisms or modules 552 including hardware and software modules or combinations of one or more hardware and one or more software modules that are stored at least partially in computer memory may comprises one or more cloning modules 502 to identify and/or create clones. The set of modules 552 may further include one or more routing track modules 504 to manage and determine routing tracks that may be inherited by various figure groups at one or more virtual hierarchies without causing any violations of rules for routing track assignments, routing track coloring, etc.

The set of modules 552 may further optionally include one or more floorplanning modules 506 to perform design planning or floorplanning to create a floorplan Constraints, design rules, and requirements are collectively referred to as a design rule for singular or design rules for plural. In addition or in the alternative, the set of modules 552 may further include one or more legal device pattern modules 508 to identify and/or create legal device patterns into one or more figure groups so that all the pertinent rules or requirements will be automatically complied with so long as the arrangements in these legal device patters are observed.

In some embodiments, the set of modules 552 may further include one or more engineering change order (ECO) modules 510 to function in tandem with figure groups and virtual hierarchies to implement engineering change orders. The set of modules 552 may also include a detachment or materialization module 512 to materialize a figure group into a physical block and to materialize a virtual hierarchy into a physical hierarchy and update the physical hierarchical structure of a layout accordingly. Any of these modules described may be stored at least partially in memory and include or function in tandem with one or more microprocessors or one or more processor cores to perform respective functions described herein.

The set of modules 552 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC (integrated circuits) fabrication facility that in turn fabricates the requisite photomasks and the eventual electronic circuit.

In some embodiments, the computing system 500 may include the various resources 528 such that these various resources may be invoked from within the computing system via a computer bus 580 (e.g., a data bus interfacing a microprocessor 592 and the non-transitory computer accessible storage medium 598 or a system bus 590 between a microprocessor 592 and one or more engines in the various resources 528). In some other embodiments, some or all of these various resources may be located remotely from the computing system 500 such that the computing system may access the some or all of these resources via a computer bus 580 and one or more network components.

The computing system may also include one or more modules in the set of modules 552. One or more modules in the set 552 may include or at least function in tandem with a microprocessor 592 via a computer bus 594 in some embodiments. In these embodiments, a single microprocessor 592 may be included in and thus shared among more than one module even when the computing system 500 includes only one microprocessor 592. A microprocessor 592 may further access some non-transitory memory 598 (e.g., random access memory or RAM) via a system bus 596 to read and/or write data during the microprocessor's execution of processes.

In various embodiments described herein, these techniques described herein update an electronic design with an abstract mechanism while ensuring that the electronic design remains LVS (layout versus schematic) correct. In these embodiments, updating al electronic design may include, for example, moving a plurality of layout component designs, modifying one or more cells or one or more individual layout components, modifying one or more nets, modifying the placement of a plurality of layout components, etc. Updating an electronic design may be accomplished by an engineering change order (ECO). For example, an engineering change order may require the addition of a device into a cell situated at a lower hierarchical level in a hierarchical physical design.

In some embodiments, these techniques described herein may ensure that every schematic instance in a schematic design corresponds to a figure group located at a virtual hierarchy in the corresponding layout to avoid checking out one or more physical cells or blocks from a hierarchical layout database for ECO implementation and checking such one or more physical cells or blocks back into the hierarchical layout database after the ECO implementation is complete. In these embodiments, the layout or a portion thereof is maintained flat, rather than hierarchical, while virtual hierarchies are employed to provide the benefits of both having a flat layout and having a virtual hierarchical structure, without having the shortcomings resulting from having only a flat layout or having only a hierarchical layout.

In implementing ECOs, these techniques not only implement the modifications to the layout but also check the layout against the schematic as well as update the circuit component designs and connectivity in both the schematic design and the layout to ensure that the layout, after the ECO implementation, still remains consistent with the corresponding schematic design.

In some embodiments, these techniques further create and maintain synchronous clones for figure groups sharing the same topology and the same hierarchical parameter values of one or more common hierarchical parameters. These synchronous clones greatly simplify the manipulation of sets of layout circuit component designs in the form of figure groups without requiring any physical hierarchies as in the "makecell" command in OpenAccess® or other equivalent commands that create physical cells or blocks and hence physical hierarchies in the layout. Rather, these techniques adopt the figure groups located at one or more virtual hierarchies, which appear to be hierarchical yet only at the logic level and thus does not alter the physical hierarchical structure (e.g., a flat structure) of the layout. As a result, synchronous clones may be used to manipulate multiple clones at once by, for example, modifying one of the synchronous clones, rather than modifying each of the clones on an individual basis, while completely ignoring the hierarchical structure of the layout and hence the tedious and expensive network inputs and outputs (I/Os) of checking in and checking out physical cells or blocks as conventional approaches do.

SYSTEM ARCHITECTURE OVERVIEW

Figure 6:
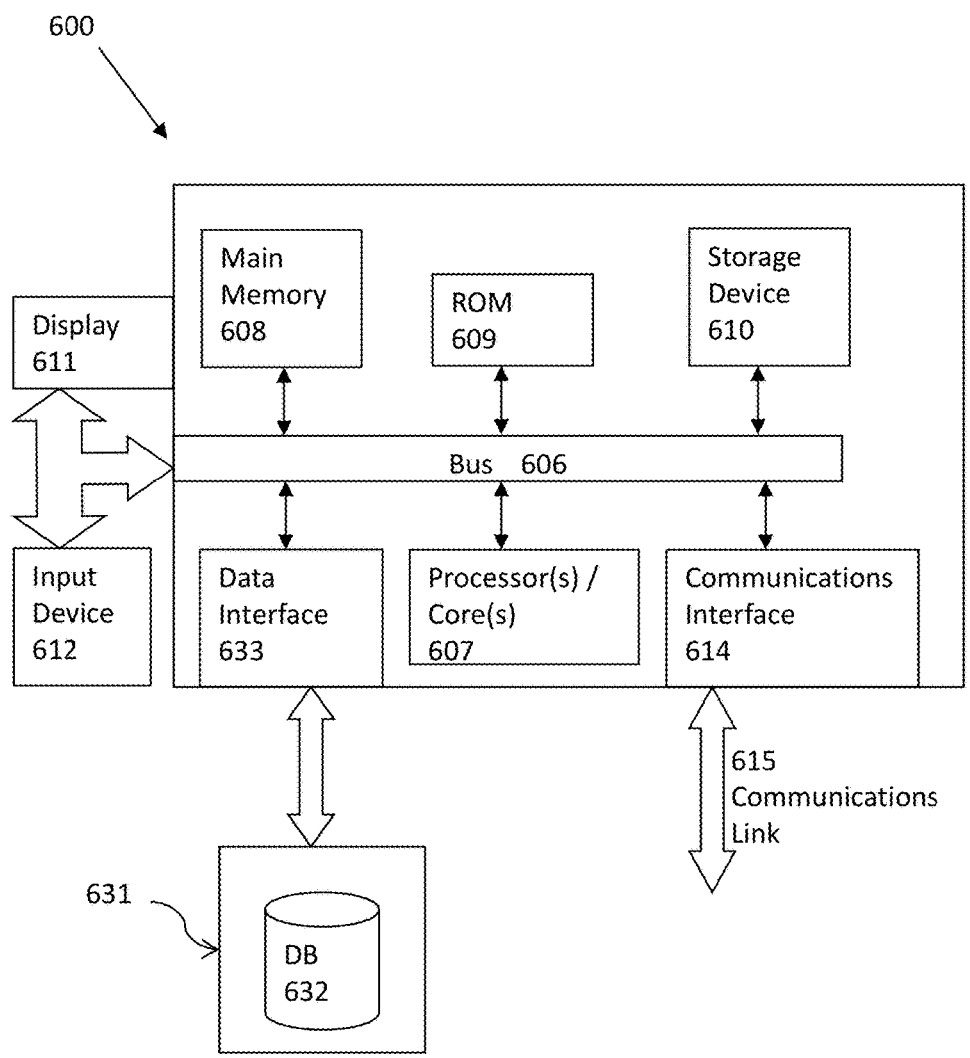
FIG. 6 illustrates a computerized system on which a method for implementing engineering change orders (ECOs) with figure groups and virtual hierarchies may be implemented.

FIG. 6 illustrates a computerized system on which a method for implementing engineering change orders (ECOs) with figure groups and virtual hierarchies may be implemented. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown). The illustrative computing system 600 may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 600 may include or may be a part of a cloud computing platform in some embodiments.

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program (e.g., application code) through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633. A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

I claim:

1. A computer implemented method for implementing engineering change orders (ECOs) with figure groups and virtual hierarchies, comprising:
performing a process at least by executing a sequence of instructions with at least an ECO module functioning in tandem with a micro-processor of a computing system, the process comprising:
identifying a schematic design and a layout comprising at least one virtual hierarchy of an electronic design;
implementing an ECO to modify at least one layout circuit component design in a figure group, without considering a physical hierarchical structure of the layout;

checking the figure group based in part or in whole upon one or more criteria; and updating one or more data structures for the at least one virtual hierarchy and the figure group based in part or in whole upon the ECO.

2. The computer implemented method of claim 1, the process further comprising:

maintaining a one-to-one mapping between figure groups in the layout and schematic instances in the schematic design.

3. The computer implemented method of claim 2, further comprising:

identifying one or more schematic instances that do not correspond to figure groups in the layout from at least one data structure of the one or more data structures; and generating one or more figure groups for the one or more schematic instances that have been identified not to correspond to the figure groups.

4. The computer implemented method of claim 3, further comprising:

determining one or more virtual hierarchies at which the one or more figure groups are respectively located; and updating the one or more data structures for the one or more figure groups and for the one or more virtual hierarchies.

5. The computer implemented method of claim 1, further comprising:

maintaining synchronous clones for a plurality of figure groups at one or more virtual hierarchies.

6. The computer implemented method of claim 5, further comprising:

identifying the plurality of figure groups;

identifying the one or more virtual hierarchies at which the plurality of figure groups are respectively located; and determining whether the plurality of figure groups have a same topology.

7. The computer implemented method of claim 6, further comprising:

identifying one or more common hierarchical parameters shared by the plurality of figure groups; and determining whether the plurality of figure groups have same hierarchical parameter values for the one or more common hierarchical parameters.

8. The computer implemented method of claim 7, further comprising:

creating a plurality of synchronous clones for the plurality of figure groups; and updating the one or more data structures with information about the plurality of synchronous clones for the plurality of figure groups.

9. The computer implemented method of claim 1, checking the figure group based in part or in whole upon one or more criteria comprising:

identifying a schematic instance from the schematic design based in part or in whole upon the at least one layout circuit component and binding information between the schematic design and the layout;

identifying a set of layout circuit component designs and layout connectivity from the figure group; and identifying a set of schematic circuit component designs and schematic connectivity from the schematic instance.

10. The computer implemented method of claim 9, checking the figure group based in part or in whole upon one or more criteria comprising:

determining whether the set of layout circuit component designs in the figure group correspond to the set of schematic circuit component designs in the schematic instance to generate a first determination result; and updating the figure group or the schematic instance when one or more discrepancies are identified in the first determination result.

11. The computer implemented method of claim 9, checking the figure group based in part or in whole upon one or more criteria comprising:

determining whether the and layout connectivity for or in the figure group is identical to the schematic connectivity for or in the schematic instance to generate a second determination result; and updating the figure group or the schematic instance when one or more discrepancies are identified in the second determination result.

12. The computer implemented method of claim 1, further comprising:

determining whether the layout includes a physical hierarchical portion corresponding a physical hierarchical structure having multiple physical hierarchies;

determining whether the ECO changes the physical hierarchical structure;

determining whether the ECO changes a virtual hierarchical structure having at least the at least one virtual hierarchy; and updating the virtual hierarchical structure to be in sync with a schematic hierarchical structure of the schematic design.

13. A system for implementing engineering change orders (ECOs) with figure groups and virtual hierarchies, comprising:

non-transitory computer accessible storage medium storing thereupon program code;

at least one processor executing the program code to identify a schematic design and a layout comprising at least one virtual hierarchy of an electronic design;

one or more modules that are stored at least partially in memory of one or more computing systems, include or function in conjunction with at least one hardware processor of the one or more computing systems, and are configured to execute the program code to implement an ECO to modify at least one layout circuit component design in a figure group, without considering a physical hierarchical structure of the layout;

the at least one processor further executing the program code to check the figure group based in part or in whole upon one or more criteria; and the at least one processor further executing the program code to update one or more data structures for the at least one virtual hierarchy and the figure group based in part or in whole upon the ECO.

14. The system for claim 13, the at least one processor further executing the program code to maintain a one-to-one mapping between figure groups in the layout and schematic instances in the schematic design.

15. The system for claim 13, the at least one processor further executing the program code to identify one or more schematic instances that do not correspond to figure groups in the layout from at least one data structure of the one or more data structures, to generate one or more figure groups for the one or more schematic instances that have been identified not to correspond to the figure groups, to determine one or more virtual hierarchies at which the one or more figure groups are respectively located, and to update the one or more data structures for the one or more figure groups and for the one or more virtual hierarchies.

16. The system for claim 13, the at least one processor further executing the program code at least to maintain synchronous clones for a plurality of figure groups at one or more virtual hierarchies at least by identifying the plurality of figure groups, identifying the one or more virtual hierarchies at which the plurality of figure groups are respectively located, determining whether the plurality of figure groups have a same topology, identifying one or more common hierarchical parameters shared by the plurality of figure groups, determining whether the plurality of figure groups have same hierarchical parameter values for the one or more common hierarchical parameters, creating a plurality of synchronous clones for the plurality of figure groups, and updating the one or more data structures with information about the plurality of synchronous clones for the plurality of figure groups.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing engineering change orders (ECOs) with figure groups and virtual hierarchies, the set of acts comprising:
    performing a process at least by executing a sequence of instructions with at least an ECO module functioning in tandem with a micro-processor of a computing system, the process comprising:
    identifying a schematic design and a layout comprising at least one virtual hierarchy of an electronic design;
    implementing an ECO to modify at least one layout circuit component design in a figure group, without considering a physical hierarchical structure of the layout;
    checking the figure group based in part or in whole upon one or more criteria; and
    updating one or more data structures for the at least one virtual hierarchy and the figure group based in part or in whole upon the ECO.

18. The article of manufacture of claim 17, the set of acts further comprising:
    maintaining a one-to-one mapping between figure groups in the layout and schematic instances in the schematic design, maintaining the one-to-one mapping comprising:
    identifying one or more schematic instances that do not correspond to figure groups in the layout from at least one data structure of the one or more data structures;
    generating one or more figure groups for the one or more schematic instances that have been identified not to correspond to the figure groups;
    determining one or more virtual hierarchies at which the one or more figure groups are respectively located; and
    updating the one or more data structures for the one or more figure groups and for the one or more virtual hierarchies.

19. The article of manufacture of claim 17, the set of acts further comprising:
    maintaining synchronous clones for a plurality of figure groups at one or more virtual hierarchies, maintaining the synchronous clones comprising:
    identifying the plurality of figure groups;
    identifying the one or more virtual hierarchies at which the plurality of figure groups are respectively located;
    determining whether the plurality of figure groups have a same topology;
    identifying one or more common hierarchical parameters shared by the plurality of figure groups;
    determining whether the plurality of figure groups have same hierarchical parameter values for the one or more common hierarchical parameters;
    creating a plurality of synchronous clones for the plurality of figure groups; and
    updating the one or more data structures with information about the plurality of synchronous clones for the plurality of figure groups.

20. The article of manufacture of claim 17, the set of acts further comprising:
    identifying a schematic instance from the schematic design based in part or in whole upon the at least one layout circuit component and binding information between the schematic design and the layout;
    identifying a set of layout circuit component designs and layout connectivity from the figure group;
    identifying a set of schematic circuit component designs and schematic connectivity from the schematic instance;
    determining whether the set of layout circuit component designs in the figure group correspond to the set of schematic circuit component designs in the schematic instance to generate a first determination result;
    determining whether the and layout connectivity for or in the figure group is identical to the schematic connectivity for or in the schematic instance to generate a second determination result; and
    updating the figure group or the schematic instance when one or more discrepancies are identified in the first determination result or in the second determination result.

* * * * *